US010825398B2

(12) United States Patent
Kang et al.

(10) Patent No.: US 10,825,398 B2
(45) Date of Patent: Nov. 3, 2020

(54) SCAN DRIVING DEVICE AND DISPLAY DEVICE HAVING THE SAME

(71) Applicant: Samsung Display Co., Ltd., Yongin-si (KR)

(72) Inventors: Keunoh Kang, Uijeongbu-si (KR); Dae-Sik Lee, Hwaseong-si (KR); Kihyun Pyun, Gwangmyeong-si (KR); Song Yi Han, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/571,487

(22) Filed: Sep. 16, 2019

(65) Prior Publication Data

US 2020/0118495 A1 Apr. 16, 2020

(30) Foreign Application Priority Data

Oct. 16, 2018 (KR) ........................ 10-2018-0123315

(51) Int. Cl.

| | |
|---|---|
| ***G06F 3/046*** | (2006.01) |
| ***G09G 3/3266*** | (2016.01) |
| ***G09G 3/3225*** | (2016.01) |
| ***G09G 3/36*** | (2006.01) |
| ***G09G 3/3275*** | (2016.01) |

(52) U.S. Cl.

CPC ......... *G09G 3/3266* (2013.01); *G09G 3/3225* (2013.01); *G09G 3/3275* (2013.01); *G09G 3/3648* (2013.01); *G09G 3/3688* (2013.01); *G09G 2300/0404* (2013.01)

(58) Field of Classification Search

CPC .. G09G 3/3225; G09G 3/3266; G09G 3/3648; G09G 3/3688; G09G 3/3275; G09G 2300/0404

See application file for complete search history.

(56) References Cited

U.S. PATENT DOCUMENTS

| | | | | |
|---|---|---|---|---|
| 8,692,757 B2 * | 4/2014 | Bang | G09G 3/3648 | 345/100 |
| 9,898,985 B2 * | 2/2018 | Cao | G09G 3/36 | |
| 2015/0194800 A1 * | 7/2015 | Kim | G09G 3/3677 | 361/95 |

FOREIGN PATENT DOCUMENTS

KR 10-2015-0081867 A 7/2015

* cited by examiner

*Primary Examiner* — Kwang-Su Yang
(74) *Attorney, Agent, or Firm* — Lewis Roca Rothgerber Christie LLP

(57) ABSTRACT

A display device includes a display panel including scan lines, data lines, and a plurality of pixels coupled to the scan lines and the data lines, a voltage generator configured to generate an on-voltage and an off-voltage, a scan controller configured to generate a scan start signal based on the on-voltage, the off-voltage, and a vertical start signal, and a scan driver configured to generate a scan signal based on the scan start signal and to provide the scan signal to a scan line of the scan lines. The scan controller is configured to detect a voltage level of the scan start signal and to output a shutdown signal based on the voltage level of the scan start signal during an over current detecting period.

20 Claims, 9 Drawing Sheets

SCAN DRIVING DEVICE AND DISPLAY DEVICE HAVING THE SAME

CROSS-REFERENCE TO RELATED APPLICATION

This application claims priority to and the benefit of Korean Patent Application No. 10-2018-0123315, filed on Oct. 16, 2018 in the Korean Intellectual Property Office (KIPO), the content of which is incorporated herein in its entirety by reference.

BACKGROUND

1. Field

An embodiment of the present invention relates to a scan driving device and a display device having the same.

2. Description of the Related Art

Flat panel display (FPD) devices are widely used as a display device of electronic devices because FPD devices may be relatively lightweight and thin compared to cathode-ray tube (CRT) display devices. Examples of FPD devices are liquid crystal display (LCD) devices, field emission display (FED) devices, plasma display panel (PDP) devices, and organic light emitting display (OLED) devices. The OLED devices have been spotlighted as next-generation display devices because the OLED devices may have various advantages such as a wide viewing angle, a rapid response speed, a thin thickness, low power consumption, etc.

A display device may include a display panel that displays an images and a driver for driving the display panel. For example, the OLED device may include an organic light emitting display panel in which scan lines, data lines, and pixels are formed. An OLED device may also include a scan driving circuit that outputs scan signals to the scan lines and a data driving circuit that outputs data signals to the data lines. A short between lines that provide the driving signals may occur as a size of the display device (e.g., size of a pixel of the display device) decreases and a resolution of the display device increases.

SUMMARY

Aspects of some example embodiments are directed toward a scan driving device capable of improving display quality.

Aspects of some example embodiments are directed toward a display device capable of improving display quality.

According to example embodiments, a display device may include a display panel including scan lines, data lines, and a plurality of pixels coupled to the scan lines and the data lines, a voltage generator configured to generate an on-voltage and an off-voltage, a scan controller configured to generate a scan start signal based on the on-voltage, the off-voltage, and a vertical start signal, and a scan driver configured to generate a scan signal based on the scan start signal and to provide the scan signal to a scan line of the scan lines. The scan controller is configured to detect a voltage level of the scan start signal and to output a shutdown signal based on the voltage level of the scan start signal during an over current detecting period.

In example embodiments, the scan controller may include an on-transistor including a gate electrode configured to receive the vertical start signal, a first electrode coupled to a switch circuit, and a second electrode coupled to a first node, an off-transistor including a gate electrode configured to receive the vertical start signal, a first electrode configured to receive the off-voltage, and a second electrode coupled to the first node, a detecting transistor including a gate electrode configured to receive the vertical start signal, a first electrode coupled to the switch circuit, and a second electrode coupled to the first node, the switch circuit configured to selectively couple an on-voltage providing line configured to provide the on-voltage to the on-transistor or to the detecting transistor, a comparator including a first input terminal that receives a voltage of the first node, a second input terminal configured to receive a set reference voltage, and an output terminal configured to output a comparing signal by comparing the voltage of the first node and the reference voltage, and a protection circuit configured to output the shutdown signal based on the comparing signal.

In example embodiments, a drain-source resistor of the detecting transistor may have greater resistance than a drain-source resistor of the on-transistor.

In example embodiments, the switch circuit may be configured to couple the on-voltage providing line to the detecting transistor during the over current detecting period, and to couple the on-voltage providing line to the on-transistor when the display panel is driven.

In example embodiments, the scan controller may further include a reference voltage controller configured to control a voltage level of the reference voltage.

In example embodiments, the on-transistor and the detecting transistor may be p-channel metal oxide semiconductor transistors, and the off-transistor may be an n-channel metal oxide semiconductor transistor.

In example embodiments, the scan controller may further include a NOT gate coupled to the gate electrode of the on-transistor, the gate electrode of the off-transistor, and the gate electrode of the detecting transistor, and may be configured to invert the vertical start signal.

In example embodiments, the on-transistor and the detecting transistor may be n-channel metal oxide semiconductor transistors, and the off-transistor may be a p-channel metal oxide semiconductor transistor.

In example embodiments, the protection circuit may be configured to detect the comparing signal when the vertical start signal falls.

In example embodiments, the over current detecting period may be a power-on period of the display device.

In example embodiments, the over current detecting period may be a vertical blank period in a frame.

In example embodiments, the scan controller may be configured to generate a clock signal and a clock bar signal based on a clock control signal, and to provide the clock signal and the clock bar signal to the scan driver.

According to example embodiments, a scan driving device may include a voltage generator configured to generate an on-voltage and an off-voltage, a scan controller configured to generate a scan start signal based on the on-voltage, the off-voltage, and a vertical start signal, and a scan driver configured to generate a scan signal based on the scan start signal. The scan controller may be configured to detect a voltage level of the scan start signal and to output a shutdown signal based on the voltage level of the scan start signal during an over current detecting period.

In example embodiments, the scan controller may include an on-transistor including a gate electrode configured to receive the vertical start signal, a first electrode coupled to a switch circuit, and a second electrode coupled to a first node, an off-transistor including a gate electrode configured to receive the vertical start signal, a first electrode that receives the off-voltage, and a second electrode coupled to the first node, a detecting transistor including a gate electrode configured to receive the vertical start signal, a first electrode coupled to the switch circuit, and a second electrode coupled to the first node, a switch circuit configured to selectively couple an on-voltage providing line that may be configured to provide the on-voltage to the on-transistor or to the detecting transistor, a comparator including a first input terminal configured to receive a voltage of the first node, a second input terminal configured to receive a set reference voltage, and an output terminal configured to output a comparing signal by comparing the voltage of the first node and the reference voltage, and a protection circuit configured to output the shutdown signal based on the comparing signal.

In example embodiments, a drain-source resistor of the detecting transistor may have greater resistance than a drain-source resistor of the on-transistor.

In example embodiments, the switch circuit may be configured to couple the on-voltage providing line to the detecting transistor during the over current detecting period.

In example embodiments, the scan controller may further include a reference voltage controller configured to control a voltage level of the reference voltage.

In example embodiments, the on-transistor and the detecting transistor may be p-channel metal oxide semiconductor transistors, and the off-transistor may be an n-channel metal oxide semiconductor transistor.

In example embodiments, the scan controller may further include a NOT gate coupled to the gate electrode of the on-transistor, the gate electrode of the off-transistor, and the gate electrode of the detecting transistor, and may be configured to invert the vertical start signal.

In example embodiments, the on-transistor and the detecting transistor may be n-channel metal oxide semiconductor transistors, and the off-transistor may be a p-channel metal oxide semiconductor transistor.

Therefore, the display device may detect the voltage level of the vertical start signal and output the shutdown signal based on the voltage level of the scan start signal during the over current detecting period. Thus, defects caused by a short of the lines may be reduced or prevented.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Hereinafter, the present inventive concept will be explained in more detail with reference to the accompanying drawings.

Figure 1:
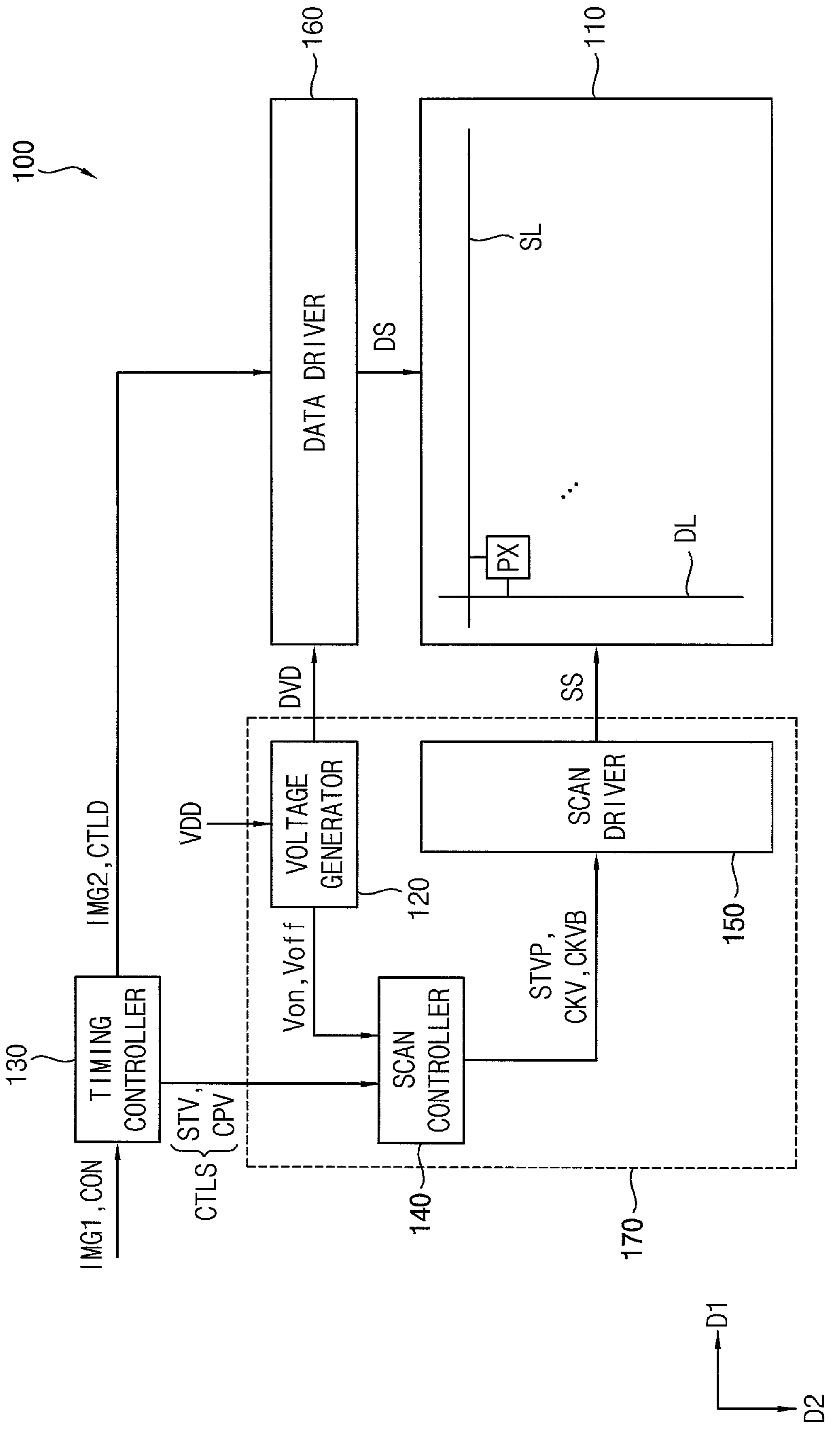
FIG. 1 is a block diagram illustrating a display device according to example embodiments.
Figure 2:
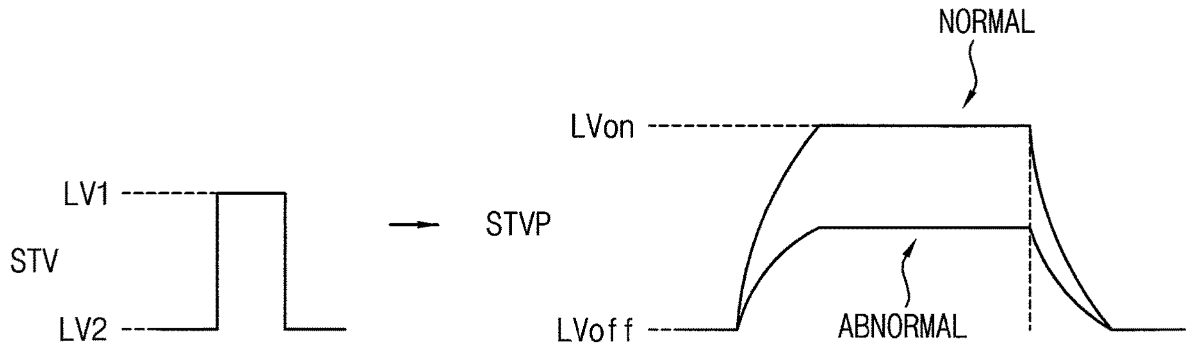
FIG. 2 is a diagram illustrating an example of an operation of a scan controller included in the display device of FIG. 1.
Figure 3:
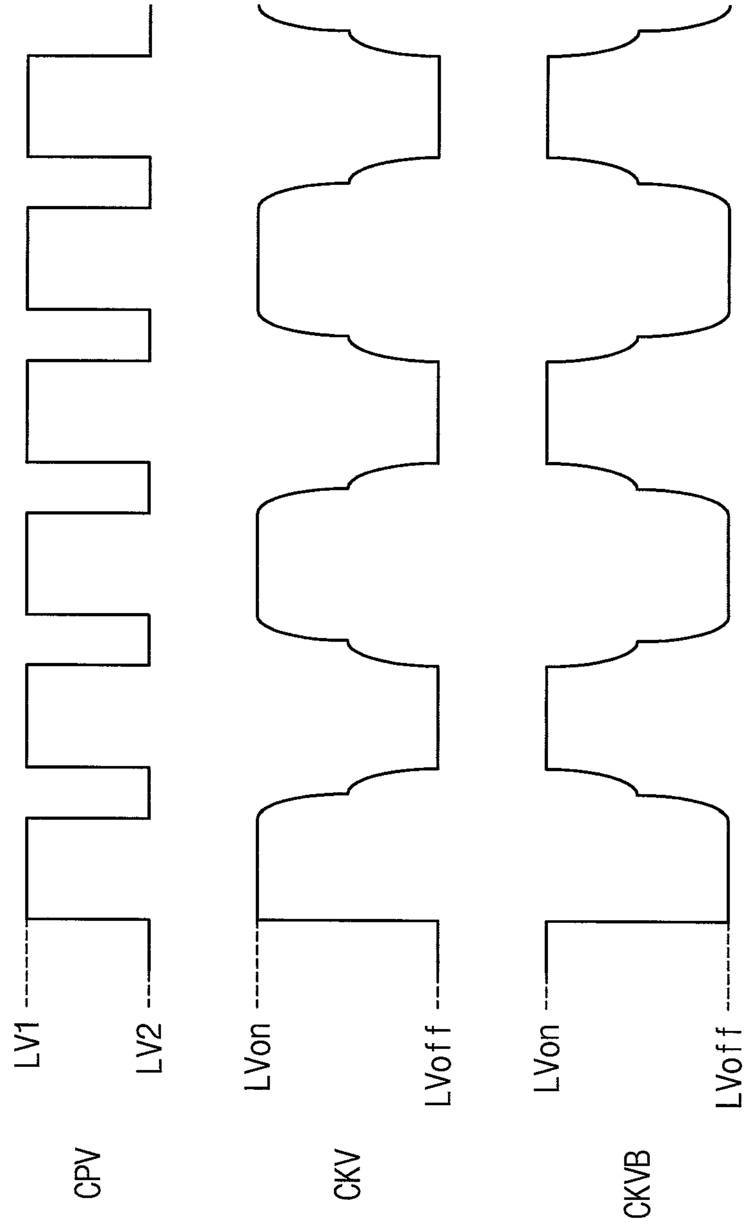
FIG. 3 is a diagram illustrating another example of an operation of a scan controller included in the display device of FIG. 1.
Figure 4:
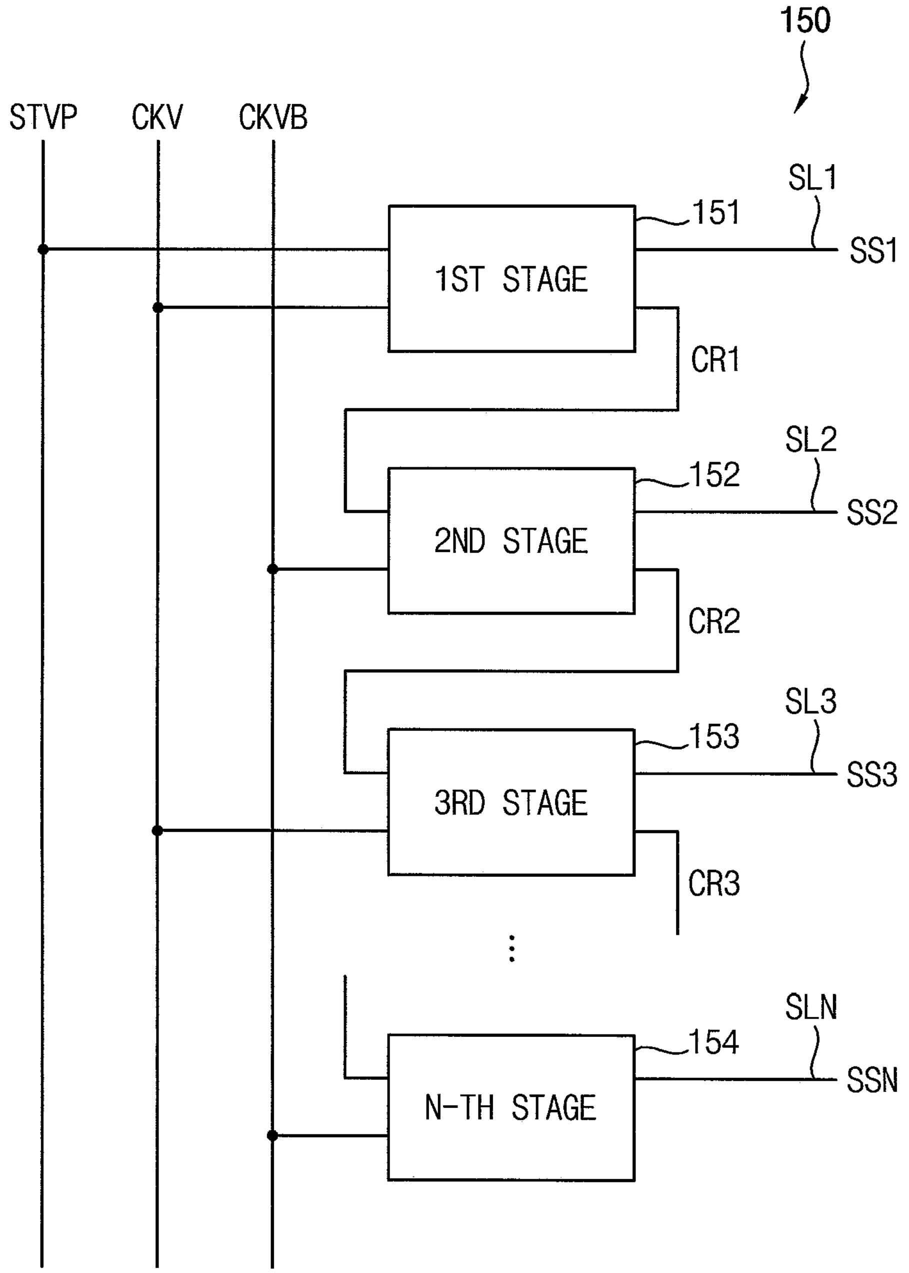
FIG. 4 is a block diagram illustrating a scan driver included in the display device of FIG. 1.

FIG. 1 is a block diagram illustrating a display device according to example embodiments. FIG. 2 is a diagram illustrating an example of an operation of a scan controller included in the display device of FIG. 1. FIG. 3 is a diagram illustrating another example of an operation of a scan controller included in the display device of FIG. 1. FIG. 4 is a block diagram illustrating a scan driver included in the display device of FIG. 1.

Referring to FIG. 1, a display device 100 may include a display panel 110, a scan driving device 170, a data driver 160, and a timing controller 130. The scan driving device 170 may include a voltage generator 120, a scan controller 140, and a scan driver 150.

The display panel 110 may include data lines DL, scan lines SL, and a plurality of pixels PX. The scan lines SL may extend in a first direction D1 and be arranged with each other in a second direction D2 perpendicular to or crossing the first direction D1. The data lines DL may extend in the second direction D2 and be arranged with each other in the first direction D1. For example, the first direction D1 may be parallel with a long side of the display panel 110, and the second direction D2 may be parallel with a short side of the display panel 110. Each of the pixels PX may be formed in intersection or crossing regions of the data lines DL and the scan lines SL. In some example embodiments, each of the pixels PX may include a thin film transistor electrically coupled (e.g., electrically connected) to the scan line SL and the data line DL, a storage capacitor coupled (e.g., connected) to the thin film transistor, a driving transistor coupled to the storage capacitor, and an organic light emitting diode coupled (e.g., connected) to the driving transistor. Thus, the display panel 110 may be an organic light emitting panel, and the display device 100 may be an organic light emitting display device. In other example embodiments, each of the pixels PX may include a thin film transistor electrically coupled to the scan line SL and the data line DL, a liquid crystal capacitor and a storage capacitor coupled to the thin film transistor. Thus, the display panel 110 may be a liquid crystal display panel, and the display device 100 may be a liquid crystal display device.

The voltage generator 120 may receive a DC power VDD from an external device and generate a plurality of voltages in order to drive the display panel 110. The voltage generator 120 may generate an on-voltage Von and an off-voltage Voff provided to the scan controller 140, and a data driving voltage DVD provided to the data driver 160. The voltage generator 120 may generate the on-voltage Von and the off-voltage Voff and provide the on-voltage Von and the off-voltage Voff to the scan controller 140. The on-voltage Von and the off-voltage Voff may be driving voltages to generate a scan signal SS provided to the scan line SL. The voltage generator 120 may generate the data driving voltage DVD and provide the data driving voltage DVD to the data driver 160. For example, the voltage generator may generate an analog power voltage, a digital power voltage, etc. and provide the analog power voltage, the digital power voltage, etc. to the data driver 160. The analog power voltage and the digital power voltage may be driving voltages to generate a data signal DS provided to the data line DL. Further, the voltage generator 120 may generate a panel driving voltage provided to the display panel 110. For example, when the display panel 110 is the liquid crystal display panel, the voltage generator 120 may generate the panel driving voltage that includes a common voltage, a storage voltage, etc. The common voltage may be a driving voltage provided to the liquid crystal capacitor included in the pixel PX, and the storage voltage may be a driving voltage provided to the storage capacitor included in the pixel PX.

The timing controller 130 may receive a first image data IMG1 and a control signal CON from the external device. The timing controller 130 may convert the first image data IMG1 to the second image data IMG2. The timing controller 130 may convert the first image data IMG1 to the second image data IMG2 by adapting an algorithm that compensates display quality of the first image data IMG1 and provide the second image data IMG2 to the data driver 160. The timing controller 130 may generate a scan control signal CTLS and a data control signal CTLD to control a driving timing of the second image data IMG2 based on the control signal CON. For example, the scan control signal CTLS may include a vertical start signal STV and at least one clock control signal CPV. The data control signal CTLD may include a horizontal start signal and a data clock signal. The timing controller 130 may provide the vertical start signal STV and the clock control signal CPV to the scan controller 140 and provide the data control signal CTLD to the data driver 160.

The scan controller 140 may generate scan start signal STVP based on the on-voltage Von, the off-voltage Voff, and the vertical start signal STV. The scan controller 140 may receive the on-voltage Von and the off-voltage Voff from the voltage generator 120 and receive the vertical start signal STV from the timing controller 130. The scan controller may generate the scan start signal STVP using the on-voltage Von and the off-voltage Voff in response to the vertical start signal STV provided from the timing controller 130. Referring to FIG. 2, the vertical start signal STV may be a signal that swings between a first voltage level LV1 and a second voltage level LV2. The scan controller 140 may convert the vertical start signal STV to the scan start signal STVP using the on-voltage Von and the off-voltage Voff. However, when a line that outputs the scan start signal STVP and a line that provides the off-voltage Voff are short, a voltage level of the scan start signal STVP may decreases. The display device 100 according to example embodiments may detect the voltage level of the scan start signal STVP during an over current detecting period and output a shutdown signal based on the voltage level of the scan start signal STVP. Thus, display defects caused by a short of the lines may be reduced or prevented.

The scan controller 140 may include an on-transistor, an off-transistor, a detecting transistor, a switch circuit, a comparator, and a protection circuit. The on-transistor and the off-transistor may alternately turn on in response to the vertical start signal when the display device 100 is normally driven. In some example embodiments, the on-transistor may be a p-channel metal oxide semiconductor PMOS transistor and the off-transistor may be an n-channel metal oxide semiconductor NMOS transistor. In other example embodiments, the on-transistor may be an n-channel metal oxide semiconductor NMOS transistor and the off-transistor may be a p-channel metal oxide semiconductor PMOS transistor. The scan controller 140 may generate the scan start signal STVP of which a voltage level is the same as the on-voltage Von while the on-transistor turns on, and generate the scan start signal STVP of which a voltage level is the same as the off-voltage Voff while the off-transistor turns on. The on-transistor and the off-transistor may alternately turn on while the display device 100 is normally driven. The detecting transistor and the off-transistor may alternately turn on during the over current detecting period. The detecting transistor may be the same type as the on-transistor. For example, when the on-transistor is the n-channel metal oxide semiconductor transistor, the detecting transistor may be the n-channel metal oxide semiconductor transistor. For example, when the on-transistor is the p-channel metal oxide semiconductor transistor, the detecting transistor may be the p-channel metal oxide semiconductor transistor. A drain-source resistor of the detecting transistor may have a greater resistance than the drain-source resistor of the on-transistor. When the line that outputs the scan start signal STVP and the line that provides the off-voltage Voff are shorted during the over current detecting period, a short resistor may occur. The on-voltage Von may be divided by the detecting transistor and the short resistor and may output under (e.g., a lower value) the voltage level of the on-voltage Von. In some example embodiments, the over current detecting period may be a power-on period of the display device 100. In other example embodiments, the over current detecting period may be a vertical blank period in a frame. When the line that outputs the scan start signal STVP and the line that provides the off-voltage Voff are not short, the scan controller 140 may generate the scan start signal STVP that swings between the voltage level LVon of the on-voltage Von and the voltage level LVoff of the off-voltage Voff during the over current detecting period. When the line that outputs the scan start signal STVP and the line that provides the off-voltage Voff are short, the scan controller 140 may generate the scan start signal STVP that swings between the voltage level lower than the on-voltage Von and the voltage level LVoff of the off-voltage Voff during the over current detecting period. The comparator may receive the scan start signal STVP during the over current detecting period, compare the voltage level of the scan start signal STVP to a reference voltage having a set or predetermined voltage level, and output a comparing signal. In some example embodiments, the scan controller 140 may further include a reference voltage controller that controls the voltage level of the reference voltage input to one of input terminals of the comparator. The protection circuit may detect the comparing signal when the vertical start signal STV falls (i.e., when the scan start signal STVP falls). The protection circuit may output the shutdown signal when the voltage level of the scan start signal STVP is lower than the voltage level of the reference voltage. For example, the protection circuit may provide the shutdown signal to the scan controller 140 and/or the voltage generator 120.

Further, the scan controller 140 may generate a clock signal CKV and a clock bar signal CKVB based on the on-voltage Von, the off-voltage Voff, and the clock control signal CPV. The scan controller 140 may receive the on-voltage Von and the off-voltage Voff from the voltage generator 120, and receive the clock control signal CPV from the timing controller 130. Referring FIG. 3, the clock control signal CPV may be a signal that swings between a first voltage level LV1 and the second voltage level LV2. The scan controller 140 may generate the clock signal CKV and the clock bar signal CKVB based on the clock control signal CPV using the on-voltage Von and the off-voltage Voff. The clock signal CKV and the clock bar signal CKVB may have an opposite phase.

The scan driver 150 may generate the scan signal SS based on the scan start signal STVP and provide the scan signal to the scan line SL. Referring to FIG. 4, the scan driver 150 may include a plurality of stages 151, 152, 153, 154. Each of the stages 151, 152, 153, 154 may receive the scan start signal STVP, the clock signal CKV, and the clock bar signal CKVB from the scan controller 140. Each of the stages 151, 152, 153, 154 may be coupled to an end of the scan lines SL formed in the display panel. The first stage 151 may generate a first scan signal SS1 provided to a first scan line SL1 in response to the scan start signal STVP and the clock signal CKV. The second stage 152 may generate a second scan signal SS2 provided to a second scan line SL2 in response to a first carry signal CR1 provided from the first stage 151 and the clock bar signal CKVB. The third stage 153 may generate a third scan signal SS3 provided to a third scan line SL3 in response to a second carry signal CR2 provided from the second stage 152 and the clock signal CKV. The Nth stage 154 may generate a Nth scan signal SSN provided to an Nth scan line in response to an (N−1)th carry signal provided from an (N−1)th stage and the clock bar signal CKVB (e.g., if there are an even number of stages) or the clock signal CKV (e.g., if there are an odd number of stages). The stages 151, 152, 153, 154 of the scan driver 150 may sequentially provide the scan signals SS1, SS2, SS3, SSN to the scan lines SL1, SL2, SL3, SLN.

The data driver 160 may provide the data signals DS to the pixels PX through the data lines DL. The data driver 160 may generate the data signals DS based on the data control signal CTLD and the second image data IMG2 provided from the timing controller 130. The data control signal CTLD may include the horizontal start signal and the data clock signal. The data driver 160 may output the data signals DS corresponding to the second image data IMG2 to the data lines DL of the display panel 110 in response to the horizontal start signal and the data clock signal provided from the timing controller 130.

As described above, the display device 100 according to example embodiments may detect the voltage level of the scan start signal STVP during the over current detecting period and output the shutdown signal based on the voltage level of the scan start signal STVP. Thus, the display device 100 may reduce or prevent a defect caused by the short between the line that outputs the scan start signal STVP and the line that provides the off-voltage Voff.

Figure 5:
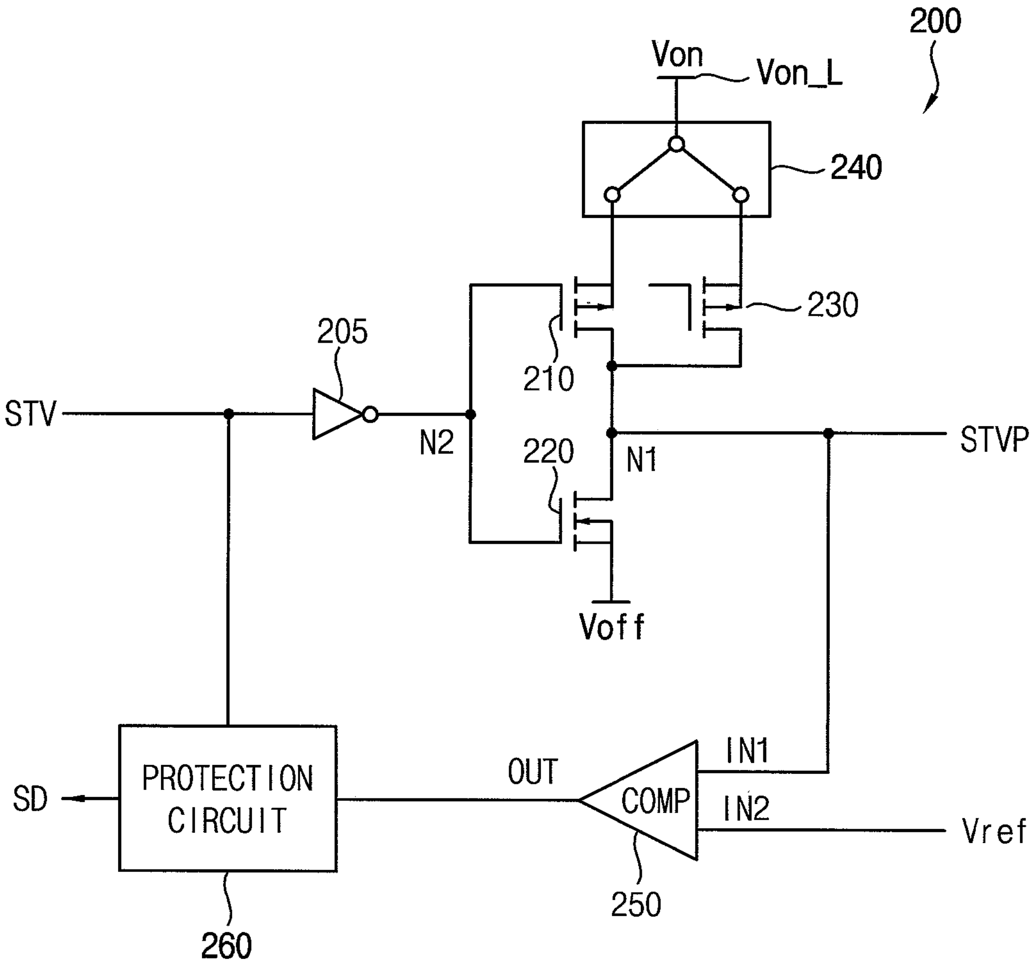
FIG. 5 is a circuit diagram illustrating an example of the scan controller included in the display device of FIG. 1.

FIG. 5 is a circuit diagram illustrating an example of the scan controller included in the display device of FIG. 1.

Referring to FIG. 5, the scan controller 200 may include a NOT gate 205, the on-transistor 210, the off-transistor 220, the detecting transistor 230, the switch circuit 240, the comparator 250, and the protection circuit 260. The on-transistor 210 and the detecting transistor 230 may be the p-channel metal oxide semiconductor transistors and the off-transistor 220 may be the n-channel metal oxide semiconductor transistor. When the on-transistor 210 and the detecting transistor 230 are the p-channel metal oxide semiconductor transistors and the off-transistor 220 are the n-channel metal oxide semiconductor transistor, the scan controller 200 may include the NOT gate 205 and invert the vertical start signal STV. Although the on-transistor 210 and the detecting transistor 230 implemented as the p-channel metal oxide semiconductor transistors and the off-transistor 220 implemented as the n-channel metal oxide semiconductor transistor are described in FIG. 5, the scan controller 200 is not limited thereto. For example, the scan controller 200 may include the on-transistor 210 and the detecting transistor 230 implemented as the n-channel metal oxide semiconductor transistors and the off-transistor 220 implemented as the p-channel metal oxide semiconductor transistor.

The NOT gate 205 may include an input terminal that receives the vertical start signal STV and an output terminal coupled to a second node N2. The NOT gate 205 may invert the vertical start signal STV provided through the input terminal. For example, the NOT gate 205 may change a voltage level of the vertical start signal STV from a first voltage level (e.g., a high level) to a second voltage level (e.g. a low level). The NOT gate may provide the inverted vertical start signal STV to the second node N2.

The switch circuit 240 may selectively couple an on-voltage providing line Von-L that provides the on-voltage to the on-transistor 210 or to the detecting transistor 230. The switch circuit 240 may couple the on-voltage providing line Von-L to the on-transistor 210 when the display device 100 is driven. The switch circuit 240 may couple the on-voltage providing line Von-L to the detecting transistor 230 during the over current detecting period. That is, the on-voltage Von may be provided to the on-transistor 210 through the switch circuit 240 when the display device 100 is driven, and the on-voltage Von may be provided to the detecting transistor 230 through the switch circuit 240 during the over current detecting period.

The on-transistor 210 may include a gate electrode (that receives the vertical start signal STV), a first electrode coupled to the switch circuit 240, and a second electrode coupled to a first node N1. The vertical start signal STV inverted through the NOT gate 205 may be provided to the gate electrode of the on-transistor 210 (i.e., the second node N2). The first electrode of the on-transistor 210 may be coupled to the on-voltage providing line Von-L through the switch circuit 240 and may receive the on-voltage Von when the display device is normally driven.

The off-transistor 220 may include a gate electrode (that receives the vertical start signal STV), a first electrode that receives the off-voltage Voff, and a second electrode coupled to the first node N1. The vertical start signal STV inverted through the NOT gate 205 may be provided to the gate electrode of the off-transistor 220. When the off-transistor 220 turns on, the off-voltage of the first electrode of the off-transistor 220 may be provided to the first node N1.

The detecting transistor 230 may include a gate electrode (that receives the vertical start signal STV), a first electrode coupled to the switch circuit 240, and a second electrode coupled to the first node N1. The vertical start signal STV inverted through the NOT gate 205 may be provided to the gate electrode of detecting transistor 230 (i.e., the second node N2). The first electrode of the detecting transistor 230 may be coupled to the on-voltage providing line Von_L through the switch circuit 240 and may receive the on-voltage Von during the over current detecting period. The drain-source resistor of the detecting transistor 230 may have greater resistance than the drain-source resistor of the on-transistor 210. The detecting transistor 230 may be operated as a dividing resistor during the over current detecting period because drain-source resistor of the detecting transistor 230 has a greater resistance than the drain-source resistor of the on-transistor 210.

The comparator 250 may include a first input terminal IN1 (that receives a voltage of the first node N1, a second input terminal IN2 that receives the reference) voltage Vref, and an output terminal OUT that outputs the comparing signal by comparing the voltage of the first node N1 and the reference Vref. In some embodiments, the voltage of the first node N1 may be the scan start signal STVP. The comparator 250 may compare the voltage level of the scan start signal STVP input to the first input terminal IN1 to the voltage level of the reference voltage Vref input to the second input terminal IN2. The scan controller 200 may further include a reference voltage controller that controls the voltage level of the reference voltage Vref. The reference voltage controller may control the voltage level of the reference voltage Vref according to property of the display device.

The protection circuit 260 may output the shutdown signal SD. The protection circuit 260 may detect the comparing signal when the vertical start signal STV (i.e., the scan start signal STVP) falls. The protection circuit 260 may output the shutdown signal SD when the voltage level of the scan start signal STVP is lower than the voltage level of the reference voltage Vref. For example, the protection circuit 260 may provide the shutdown signal SD to the scan controller 200 and/or the voltage generator.

Figure 6A:
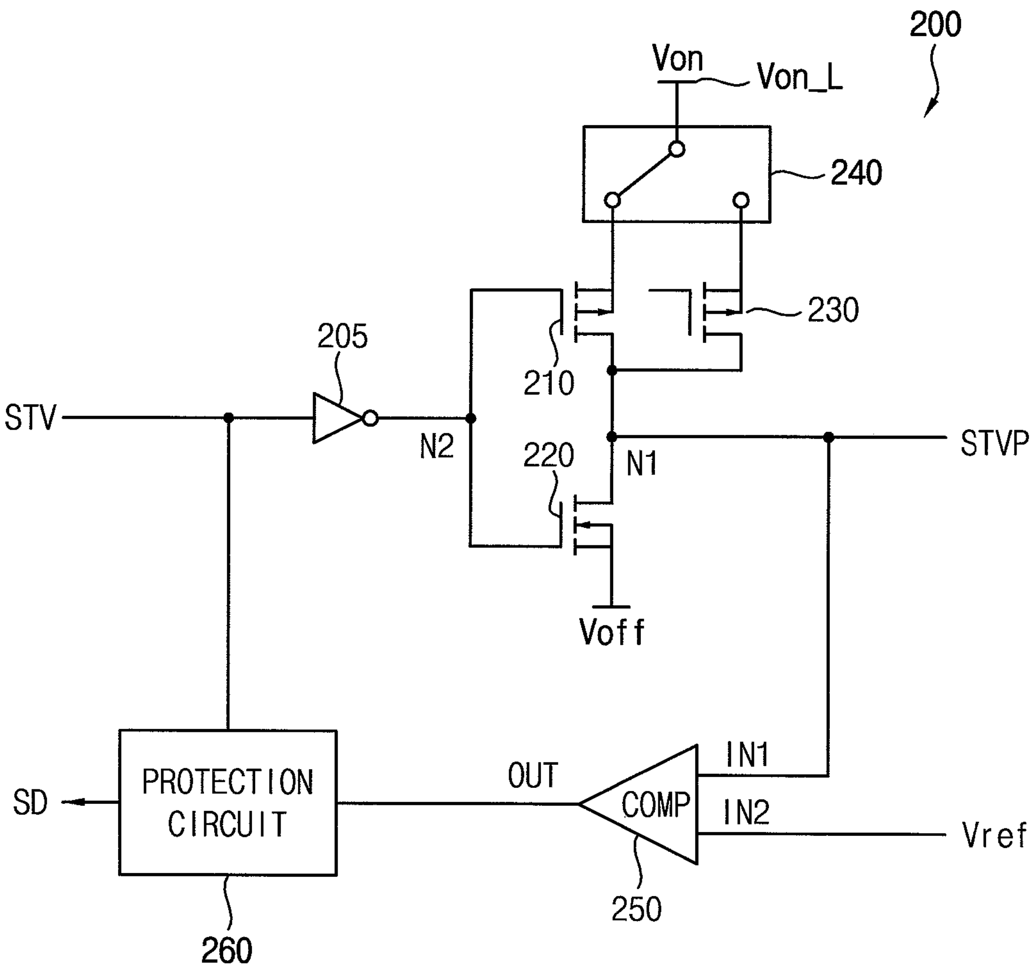
FIGS. 6A-6B are circuit diagrams illustrating an operation of the scan controller of FIG. 5.
Figure 6B:
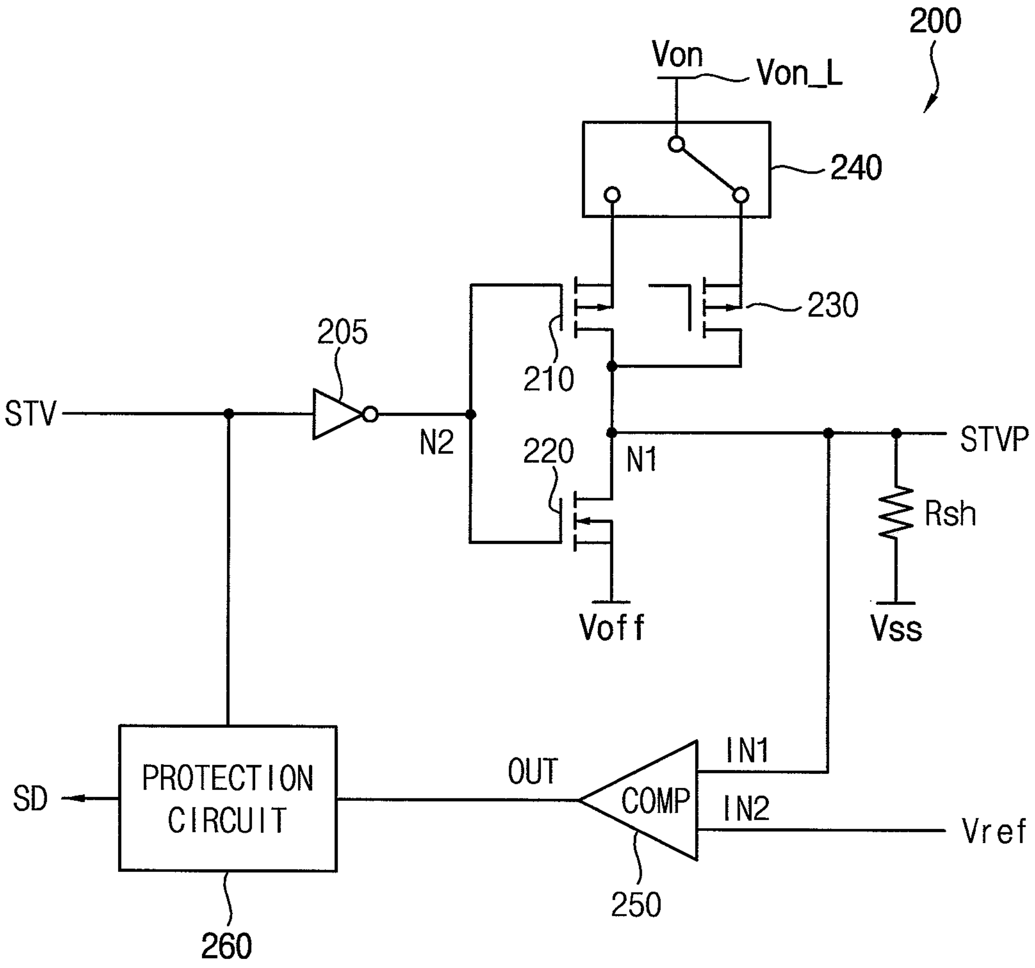

FIGS. 6A-6B are circuit diagrams illustrating an operation of the scan controller of FIG. 5.

Referring to FIG. 6A, the switch circuit 240 may couple the on-voltage providing line Von_L to the first electrode of the on-transistor 210 when the display device is normally driven. When the vertical start signal STV having the first voltage level (e.g., the high level) is provided, a voltage having the second voltage level (e.g., the low level) inverted by the NOT gate 205 may be provided to the second node N2. The on-transistor 210 may turn on and the off-transistor 220 may turn off in response to the voltage having the second voltage level. The voltage level of the scan start signal STVP may rise to the voltage level of the on-voltage Von while the on-transistor 210 turns on. When the vertical start signal STV having the second voltage level, a voltage having the first voltage level inverted by the NOT gate 205 may be provided to the second node N2. The on-transistor 210 may turn off and the off-transistor 220 may turn on in response to the voltage having the first voltage level. The scan start signal STVP may approach or fall to the voltage level of the off-voltage while the off-transistor 220 turns on. The on-transistor 210 and the off-transistor 220 may alternately turn on based on the vertical start signal STV when the display device is driven.

Referring to FIG. 6B, the switch circuit 240 may couple the on-voltage providing line Von_L to the first electrode of the detecting transistor 230 when the over current of the display device is detected. When the vertical start signal STV having the first voltage level is provided, the voltage having the second voltage level inverted by the NOT gate 205 may be provided to the second node N2. The detecting transistor 230 may turn on and the off-transistor 220 may turn off in response to the voltage having the second voltage level. When the line that outputs the scan start signal STVP and the line that provides the off-voltage Voff are not shorted, the scan start signal STVP may approach or rise to the voltage level of the on-voltage Von while the detecting transistor 230 turns on. When the line that outputs the scan start signal STVP and the line that provides the off-voltage Voff are short, a short resistor Rsh may occur by the short of the line that outputs the scan start signal STVP and the line that provides the off-voltage Voff and the on-voltage Von may be divided by the short resistor Rsh and the detecting transistor 230 of which the drain-source resistor has a greater resistance than the drain-source resistor of the on-transistor 210. Thus, the voltage level of the scan start signal STVP (i.e., the voltage level of the first node N1) may not rise to the voltage level of the on-voltage Von. The comparator 250 may compare the voltage level of the scan start signal STVP and the voltage level of the reference voltage Vref and output the comparing signal. The protection circuit 260 may receive the comparing signal per falling timings of the scan start signal STVP and determine whether the short occurs or not based on the comparing signal during the over current detecting period. When the vertical start signal STV having the second voltage level is provided, the voltage having the first voltage level inverted by the NOT gate 205 may be provided to the second node N2. The detecting transistor 230 may turn off and the off-transistor 220 may turn on in response to the voltage having the first voltage level. The detecting transistor 230 and the off-transistor may alternately turn on based on the vertical start signal STV when the over current is detected.

Figure 7A:
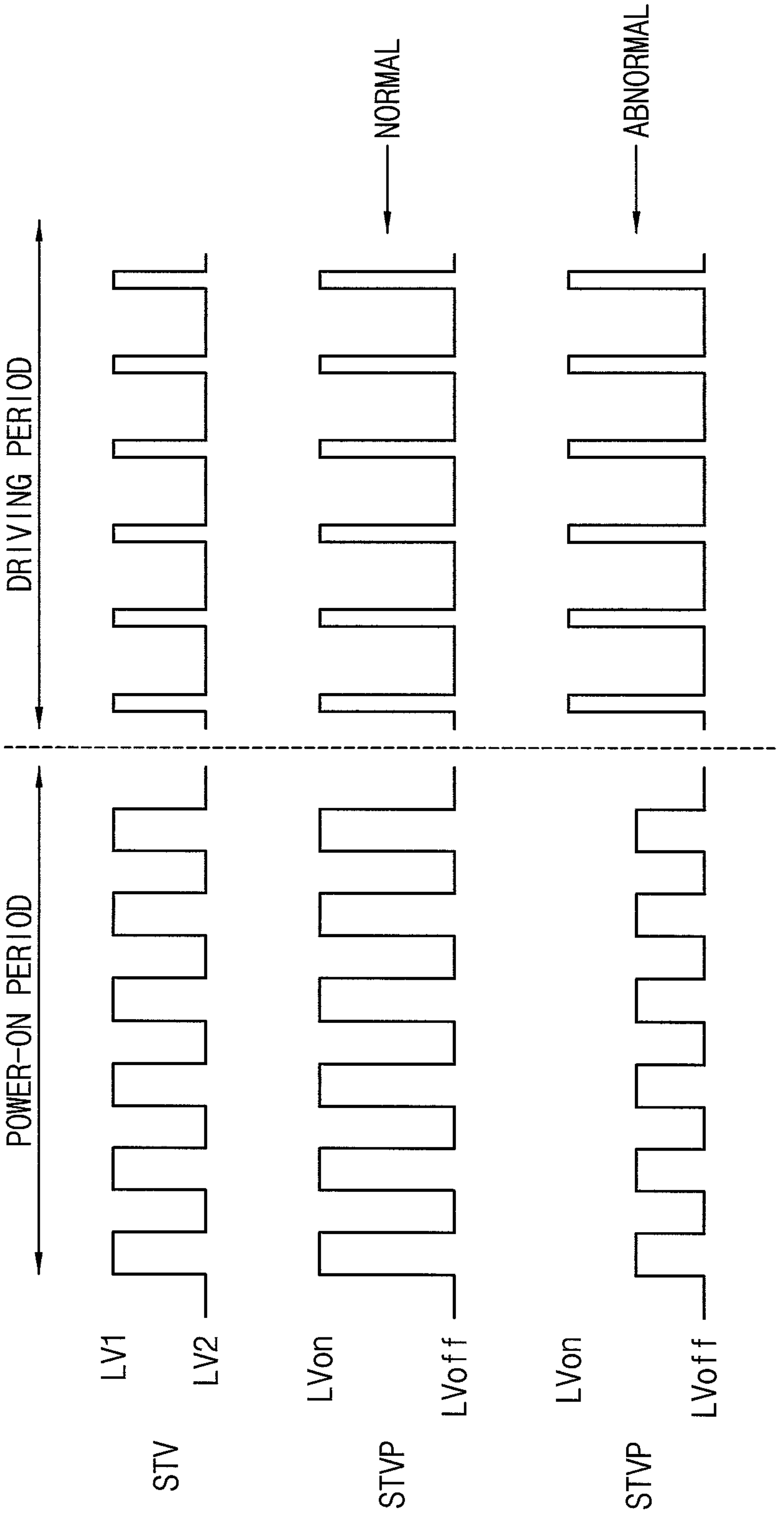
FIGS. 7A-7B are timing diagrams illustrating an operation of the scan controller included in the display device of FIG. 1.
Figure 7B:
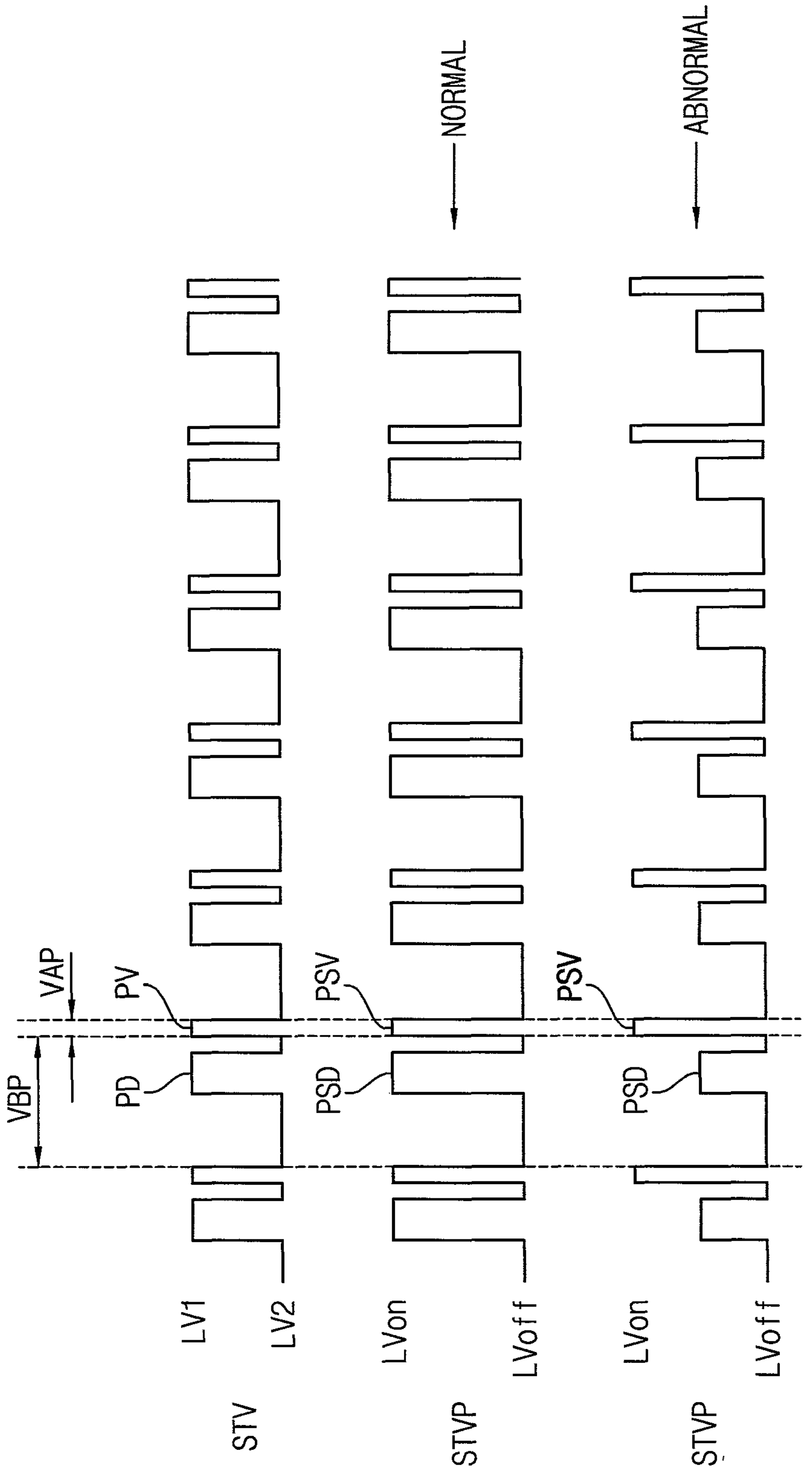

FIGS. 7A-7B are timing diagrams illustrating an operation of the scan controller included in the display device of FIG. 1.

Referring to FIG. 7A, the scan controller may detect the scan start signal STVP during a power-on period POWER-ON PERIOD of the display device. The timing controller may provide the vertical start signal STV to the scan controller during the power-on period POWER-ON PERIOD and a driving period DRIVING PERIOD. During the over current detecting period, the timing controller may generate the vertical start signal STV whose width (e.g., duration) is wider (e.g., longer) than the width (e.g., duration) of vertical start signal STV generated during the normal driving period. The scan controller may generate the scan start signal STVP based on the vertical start signal STV. Thus, defect of the scan start signal STVP may be easily detected.

The scan controller may detect the over current of the scan controller during the power-on period POWER-ON PERIOD. As described in FIG. 7A, when the line that outputs the scan start signal STVP and the line that provides the off-voltage are not short NORMAL, the scan start signal STVP that swings between the voltage level LVon of the on-voltage and the voltage level LVoff of the off-voltage may be generated. When the line that outputs the scan start signal STVP and the line that provides the off-voltage Voff are short ABNORMAL, the scan start signal STVP that swings between the voltage level lower than the voltage level LVon of the on-voltage and the voltage level LVoff of the off-voltage may be generated. The scan controller may detect the voltage level of the scan start signal STVP and output the shutdown signal when the line that outputs the scan start signal STVP and the line that provides the off-voltage Voff are short ABNORMAL.

Referring to FIG. 7B, the scan controller may detect the scan start signal STVP during the vertical blank period VBP in a frame. The timing controller may generate the vertical start signal STV. The vertical start signal STV may include a vertical start pulse PV activated during a vertical active period VAP in one frame and a detecting pulse PD activated during the vertical blank period VBP in one frame. The detecting pulse PD may be a signal to detect the voltage level of the scan start signal STVP. The timing controller may generate the detecting pulse PD whose width (e.g., duration) is wider (e.g., longer) than a width (e.g., duration) of the vertical start pulse PV. Thus, defect of the scan start signal STVP may be easily detected.

The switch circuit of the scan controller may couple the on-voltage providing line and the on-transistor during the vertical active period VAP and may couple the on-voltage providing line and the detecting transistor during the vertical blank period VBP. The scan controller may generate the scan start signal STVP based on the vertical start pulse PV during the vertical active period VAP. The scan controller may detect the voltage of the scan start signal STVP based on the detecting pulse PD during the vertical blank period VAP. As described in FIG. 7B, when the line that outputs the scan start signal STVP and the line that provides the off-voltage are not short NORMAL, the scan controller may generate the scan start signal STVP that includes a scan start pulse PSV and a scan detect pulse PSD having the same voltage level. The scan start pulse PSV and the scan detect pulse PSD included in the scan start signal STVP may have the voltage level LVon of the on-voltage and the voltage level LVoff of the off-voltage. When the line that outputs the scan start signal STVP and the line that provides the off-voltage Voff are short ABNORMAL, the scan controller may generate the scan start signal STVP that includes the scan start pulse PSV and the scan detect pulse PSD having different voltage levels. The scan start pulse PSV may have the voltage level LVon of the on-voltage and the voltage level LVoff of the off-voltage. The scan detect pulse may have the voltage level lower than the voltage level LVon of the on-voltage and the voltage level LVoff of the off-voltage. The scan controller may detect the voltage level of the scan start signal STVP (i.e., the scan detect pulse PSD) and may output the shutdown signal during the vertical blank period VBP when the line that outputs the scan start signal STVP and the line that provides the off-voltage Voff are short ABNORMAL.

The present inventive concept may be applied to a display device and an electronic device having the display device. For example, the present inventive concept may be applied to a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept."

will be understood that when an element or layer is referred to as being "connected to", "coupled to", or "adjacent to" another element or layer, it can be connected to, coupled to, or adjacent to the other element or layer, or one or more intervening elements or layers may be present. In contrast, when an element or layer is referred to as being "directly connected to", "directly coupled to", or "immediately adjacent to" another element or layer, there are no intervening elements or layers present.

As used herein, the terms "use," "using," and "used" may be considered synonymous with the terms "utilize," "utilizing," and "utilized," respectively.

The electronic or electric devices and/or any other relevant devices or components according to embodiments of the present disclosure described herein, such as, for example, an external controller, a timing controller, power management circuit, a data driver, and a gate driver, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of ordinary skill in the art should recognize that the functionality of various computing/electronic devices may be combined or integrated into a single computing/electronic device, or the functionality of a particular computing/electronic device may be distributed across one or more other computing/electronic devices without departing from the spirit and scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and equivalents thereof.

What is claimed is:

1. A display device comprising:

a display panel comprising scan lines, data lines, and a plurality of pixels coupled to the scan lines and the data lines;

a voltage generator configured to generate an on-voltage and an off-voltage;

a scan controller configured to generate a scan start signal based on the on-voltage, the off-voltage, and a vertical start signal; and a scan driver configured to generate a scan signal based on the scan start signal and to provide the scan signal to a scan line of the scan lines, wherein the scan controller is configured to detect a voltage level of the scan start signal and to output a shutdown signal based on the voltage level of the scan start signal during an over current detecting period.

2. The display device of claim 1, wherein the scan controller comprises:

an on-transistor comprising a gate electrode configured to receive the vertical start signal, a first electrode coupled to a switch circuit, and a second electrode coupled to a first node;

an off-transistor comprising a gate electrode configured to receive the vertical start signal, a first electrode configured to receive the off-voltage, and a second electrode coupled to the first node;

a detecting transistor comprising a gate electrode configured to receive the vertical start signal, a first electrode coupled to the switch circuit, and a second electrode coupled to the first node;

the switch circuit configured to selectively couple an on-voltage providing line that is configured to provide the on-voltage to the on-transistor or to the detecting transistor;

a comparator comprising a first input terminal configured to receive a voltage through the first node, a second input terminal configured to receive a set reference voltage, and an output terminal configured to output a comparing signal by comparing the voltage of the first node and the set reference voltage; and a protection circuit configured to output the shutdown signal based on the comparing signal.

3. The display device of claim 2, wherein a drain-source resistor of the detecting transistor has greater resistance than a drain-source resistor of the on-transistor.

4. The display device of claim 2, wherein the switch circuit is configured to couple the on-voltage providing line to the detecting transistor during the over current detecting period, and to couple the on-voltage providing line to the on-transistor when the display panel is driven.

5. The display device of claim 2, wherein the scan controller further comprises:

a reference voltage controller configured to control a voltage level of the reference voltage.

6. The display device of claim 2, wherein the on-transistor and the detecting transistor are p-channel metal oxide semiconductor transistors, and the off-transistor is an n-channel metal oxide semiconductor transistor.

7. The display device of claim 6, wherein the scan controller further comprises:

a NOT gate coupled to the gate electrode of the on-transistor, the gate electrode of the off-transistor, and the gate electrode of the detecting transistor, and is configured to invert the vertical start signal.

8. The display device of claim 2, wherein the on-transistor and the detecting transistor are n-channel metal oxide semiconductor transistors, and the off-transistor is a p-channel metal oxide semiconductor transistor.

9. The display device of claim 2, wherein the protection circuit is configured to detect the comparing signal when the vertical start signal falls.

10. The display device of claim 1, wherein the over current detecting period is a power-on period of the display device.

11. The display device of claim 1, wherein the over current detecting period is a vertical blank period in a frame.

12. The display device of claim 1, wherein the scan controller is configured to generate a clock signal and a clock bar signal based on a clock control signal, and to provide the clock signal and the clock bar signal to the scan driver.

13. A scan driving device comprising:

a voltage generator configured to generate an on-voltage and an off-voltage;

a scan controller configured to generate a scan start signal based on the on-voltage, the off-voltage, and a vertical start signal; and a scan driver configured to generate a scan signal based on the scan start signal, wherein the scan controller is configured to detect a voltage level of the scan start signal and to output a shutdown signal based on the voltage level of the scan start signal during an over current detecting period.

14. The scan driving device of claim 13, wherein the scan controller comprises:

an on-transistor comprising a gate electrode configured to receive the vertical start signal, a first electrode coupled to a switch circuit, and a second electrode coupled to a first node;

an off-transistor comprising a gate electrode configured to receive the vertical start signal, a first electrode that receives the off-voltage, and a second electrode coupled to the first node;

a detecting transistor comprising a gate electrode configured to receive the vertical start signal, a first electrode coupled to the switch circuit, and a second electrode coupled to the first node;

a switch circuit configured to selectively couple an on-voltage providing line that is configured to provide the on-voltage to the on-transistor or to the detecting transistor;

a comparator comprising a first input terminal configured to receive a voltage of the first node, a second input terminal configured to receive a set reference voltage, and an output terminal configured to output a comparing signal by comparing the voltage of the first node and the set reference voltage; and a protection circuit configured to output the shutdown signal based on the comparing signal.

15. The scan driving device of claim 14, wherein a drain-source resistor of the detecting transistor has greater resistance than a drain-source resistor of the on-transistor.

16. The scan driving device of claim 14, wherein the switch circuit is configured to couple the on-voltage providing line to the detecting transistor during the over current detecting period.

17. The scan driving device of claim 14, wherein the scan controller further comprises:

a reference voltage controller configured to control a voltage level of the reference voltage.

18. The scan driving device of claim 14, wherein the on-transistor and the detecting transistor are p-channel metal oxide semiconductor transistors, and the off-transistor is an n-channel metal oxide semiconductor transistor.

19. The scan driving device of claim 18, wherein the scan controller further comprises:

a NOT gate coupled to the gate electrode of the on-transistor, the gate electrode of the off-transistor, and the gate electrode of the detecting transistor, and is configured to invert the vertical start signal.

20. The scan driving device of claim 14, wherein the on-transistor and the detecting transistor are n-channel metal oxide semiconductor transistors, and the off-transistor is a p-channel metal oxide semiconductor transistor.

* * * * *